United States Patent [19]
Zomotor et al.

[11] Patent Number: 5,345,385
[45] Date of Patent: Sep. 6, 1994

[54] METHOD FOR DETECTING DRIVING SITUATION WITH RESPECT TO VEHICLE YAW BEHAVIOR

[75] Inventors: Adam Zomotor, Waiblingen; Walter Klinkner, Stuttgart; Erich Schindler, Unterweissach; Frank-Werner Mohn, Esslingen; Thomas Wohland, Stuttgart, all of Fed. Rep. of Germany

[73] Assignee: Mercedes-Benz AG, Fed. Rep. of Germany

[21] Appl. No.: 907,109

[22] Filed: Jul. 1, 1992

[30] Foreign Application Priority Data

Jul. 13, 1991 [DE] Fed. Rep. of Germany ....... 4123234

[51] Int. Cl.$^5$ .............................................. B62D 6/00
[52] U.S. Cl. .................... 364/424.05; 180/142
[58] Field of Search ............... 364/424.05, 426.02, 364/426.03, 565; 180/79.1, 140–142, 197; 280/91; 303/95, 100, 103

[56] References Cited

U.S. PATENT DOCUMENTS

| | | | |
|---|---|---|---|
| 4,706,979 | 11/1987 | Kawabe et al. | 364/424.05 |
| 4,834,204 | 5/1989 | Ito et al. | 180/140 |
| 5,001,636 | 3/1991 | Shiraishi et al. | 180/142 |
| 5,001,637 | 3/1991 | Shiraishi et al. | 364/424.05 |
| 5,019,982 | 5/1991 | Furukawa | 180/140 |
| 5,159,553 | 10/1992 | Karnopp et al. | 180/142 |

FOREIGN PATENT DOCUMENTS

| | | |
|---|---|---|
| 0150856 | 8/1985 | European Pat. Off. |
| 0392165 | 10/1990 | European Pat. Off. |
| 3608420 | 9/1986 | Fed. Rep. of Germany |
| 3919347 | 2/1990 | Fed. Rep. of Germany |
| 4010332 | 10/1990 | Fed. Rep. of Germany |
| WO88/00542 | 1/1988 | World Int. Prop. O. |
| WO89/02842 | 4/1989 | World Int. Prop. O. |

Primary Examiner—Gary Chin
Attorney, Agent, or Firm—Evenson, McKeown, Edwards & Lenahan

[57] ABSTRACT

A method detects the driving situation with respect to the yaw behavior of the vehicle, in which a desired value of the vehicle yaw angle rate $\mu_{des}$ is derived in a computer unit from measured values (such as vehicle speed, steering wheel angle), and at least one sensor signal is supplied to the computer unit from which the actual value of the vehicle yaw angle rate $\mu_{act}$ is derived. The difference between the desired value of the yaw angle rate $\mu_{des}$ and the actual value of the yaw angle rate $\mu_{act}$ is formed in the computer unit. The actual value of the yaw angle rate $\mu_{act}$ is subtracted from the desired value of the yaw angle rate $\mu_{des}$, and at least one output signal is generated in and emitted by the computer unit from this difference. The output signal represents the detected driving situation with respect to the yaw behavior of the vehicle. The magnitude of the time derivative of the difference is used to derive whether there is a tendency towards an increasingly critical driving situation.

12 Claims, 1 Drawing Sheet

METHOD FOR DETECTING DRIVING SITUATION WITH RESPECT TO VEHICLE YAW BEHAVIOR

CROSS-REFERENCE TO RELATED APPLICATIONS

This application is related to application Ser. No. 07/907,283 filed on even date herewith in the name of Adam Zomotor, et al. for APPARATUS AND METHOD FOR PREVENTING INSTABILITIES IN VEHICLE HANDLING and application Ser. No. 07/912,371 filed on Jul. 13, 1992 in the name of Adam Zomotor, et al. for METHOD AND APPARATUS FOR PREVENTING VEHICLE HANDLING INSTABILITIES.

BACKGROUND AND SUMMARY OF THE INVENTION

The present invention relates to a method for detecting the driving situation with respect to the yaw behavior of the vehicle, in which a desired value of the vehicle yaw angle rate $\mu_{des}$ is formed in a computer unit from measured values (vehicle speed, steering wheel angle), in which at least one sensor signal is supplied to the computer unit from which the actual value of the vehicle yaw angle rate $\mu_{act}$ is formed, the difference between the desired value of the yaw angle rate $\mu_{des}$ and the actual value of the yaw angle rate $\mu_{act}$ being formed in the computer unit, with the actual value of the yaw angle rate $\mu_{act}$ is subtracted from the desired value of the yaw angle rate $\mu_{des}$, and at least one output signal, being generated in the computer unit from this difference. The output signal represents the detected driving situation with respect to the yaw behavior of the vehicle.

A method for detecting the driving situation with respect to the yaw behavior of a vehicle has already been disclosed in U.S. Pat. No. DE 36,25,392A1. The yaw angle rate $\mu_{act}$ of a vehicle is measured, for example, by a fiber-optic gyro. An alternative possibility for determining the actual value of the yaw angle rate $\mu_{act}$ is by deriving the yaw angle rate $\mu_{act}$ using at least one acceleration sensor, which measures the radial acceleration of the vehicle. Furthermore, a desired value of the yaw angle rate $\mu_{act}$ is derived from the measured speed of the vehicle in the longitudinal direction and the measured steering angle. In this case, a critical driving situation is derived when the actual value of the yaw angle rate $\mu_{act}$ deviates from the desired value of the yaw angle rate $\mu_{des}$, i.e. when the actual behavior of the vehicle deviates from the desired behavior of the vehicle. This detected deviation of the actual behavior from the desired behavior of the vehicle is then used in order to minimize the deviation of the actual behavior of the vehicle from the desired behavior of the vehicle, in that an automatic intervention in the steering takes place and/or in that individual wheels of the vehicle are braked or accelerated in such that the deviation is minimized.

A so-called linear single-track model of a vehicle has been disclosed in other literature references (DE Book: Zomotor, Adam; Fahrwerktechnik [Running Gear Technology]: Fahrverhalten [Handling]; Publisher: Jörnsen Reimpell; Würzburg: Vogel, 1987; 1st Edition; ISBN 3-8023-0774-7, in particular pages 99-127), by way of which a vehicle yaw angle rate $\mu_{act}$, which under some circumstances is self-adjusting, and is then used on the basis of this model as the desired value of the yaw angle rate $\mu_{des}$, can be derived, for example, from measured values of the vehicle speed in the vehicle longitudinal direction and from the steering wheel angle or the steering angles of the wheels corresponding thereto.

An object of the present invention is to detect the driving situation with respect to the yaw behavior of the vehicle such that yaw reactions of the vehicle, which do not correspond with the desired behavior of the yaw reaction of the vehicle, can be detected as early as possible and with the greatest possible safety.

This object has been achieved according to the invention by forming the time derivative of the difference between the desired yaw angle rate and the actual yaw angle rate and generating an output signal as a function of the time derivative.

A further advantage of the present invention in comparison with the known prior art is that, as a result of the early detection of the driving situation with respect to the yaw behavior of the vehicle, unstable driving situations can be detected very early. Thus, vehicle driver can be warned very early of the possible occurrence of unstable driving situations and interventions into control devices of the vehicle can take place very early in order to be able to prevent unstable driving situations before their occurrence.

The vehicle longitudinal speed and the steering wheel angle or the steering angle of the wheels are detected by suitable sensors. These sensor signals can then be supplied to a computer unit in which a vehicle yaw angle rate $\mu_{des}$, desired by the vehicle driver, can be determined as the desired value of the yaw angle rate $\mu_{des}$ from these variables, for example, in accordance with the aforementioned linear single-track model. The driving situation with respect to the yaw behavior is then detected in the computer unit in that the actual value of the yaw angle rate $\mu_{act}$ is compared with the desired value determined. In this case, not only the magnitude of the difference of the actual value of the yaw angle rate $\mu_{act}$ from the desired value $\mu_{des}$ is considered, but also the mathematical sign of this difference and the time derivative of this difference. A particularly early detection of the possible occurrence of critical driving situations is possible especially as a result of considering the time derivative, so that the vehicle driver can then be warned before the occurrence of these critical driving situations. It is likewise then also conceivable to carry out an intervention, for example, into the steering of the vehicle or into the braking of the individual wheels even before the occurrence of this critical driving situation, such that the tendency towards a difference between the actual value of the yaw angle rate $\mu_{act}$ and the desired value of the yaw angle rate $\mu_{des}$ is reduced even before a critical driving situation is reached.

Instead of determining the desired value of the yaw angle rate $\mu_{des}$ by the linear single-track model, it is likewise possible to determine this desired value from a performance graph measured once.

BRIEF DESCRIPTION OF THE DRAWINGS

These and further objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
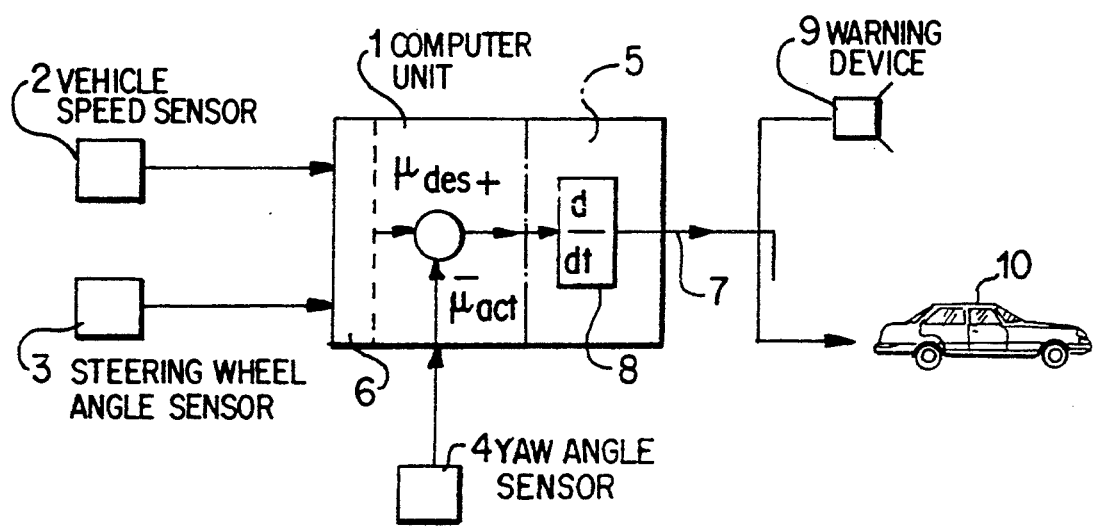
FIG. 1 is a schematic diagram of the sensors and of the computer unit.

As can be seen from FIG. 1, the signal of a sensor 2 representative of vehicle speed is supplied to the computer unit 1. The sensor may be, for example, a speed sensor, as is used in known antilock braking systems (ABS). It is likewise possible for the sensor 2 to correspond to a plurality of speed sensors of different wheels, whose signals are averaged. A signal which represents the steering wheel angle is supplied to the computer unit 1 by a sensor 3 which may thus directly be a steering wheel angle sensor. Likewise, this sensor 3 may also be a sensor which detects the steering angle of one of the wheels of the vehicle 10 or a mean value of the steering angles of the wheels of the vehicle 10. Furthermore, the signal of at least one further sensor 4 is supplied to the computer unit 1, by way of which signal the actual value of the yaw angle rate $\mu_{act}$ can then be formed in the computer unit. In this case, this sensor 4 may measure, for example, the yaw angle rate $\mu_{act}$ directly.

A desired value of the yaw angle rate $\mu_{des}$ is determined in the computer unit 1 from the signals of the sensors 2 and 3 in the part 6 of the computer unit 1, for example, by the linear single-track model. This desired value of the yaw angle rate $\mu_{des}$ is compared with the actual value of the yaw angle rate $\mu_{act}$ formed in order to form the difference between the desired value and the actual value. The driving situation with respect to the yaw behavior of the vehicle 10 is then detected in the part 5 of the computer unit, using the time derivative 8 of the difference. An output signal 7 is generated which represents the detected driving situation.

Figure 2:
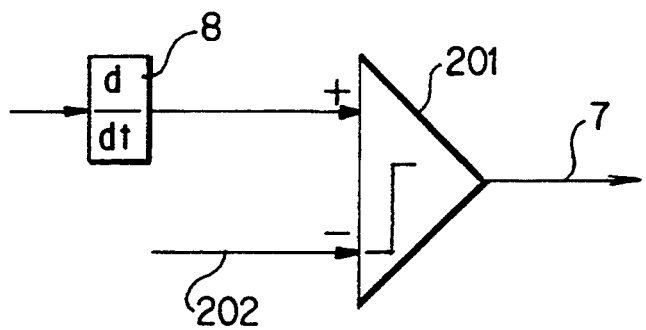
FIG. 2 is a schematic diagram of a first sequence diagram according to which the driving situation can be detected pursuant to the present invention.

According to FIG. 2, In this case part 5 of the computer unit 1 of FIG. 1 can be constructed such that this time derivative 8 of the difference is supplied to the positive input of a threshold value comparator 201, to whose negative input there is applied a signal 202 which represents a threshold value of the change with respect to time of the difference. If this threshold value comparator 201 supplies an output signal 7 whose value is equal to 1, i.e. if this difference exceeds the threshold value, a tendency towards a critical driving situation is derived.

Figure 3:
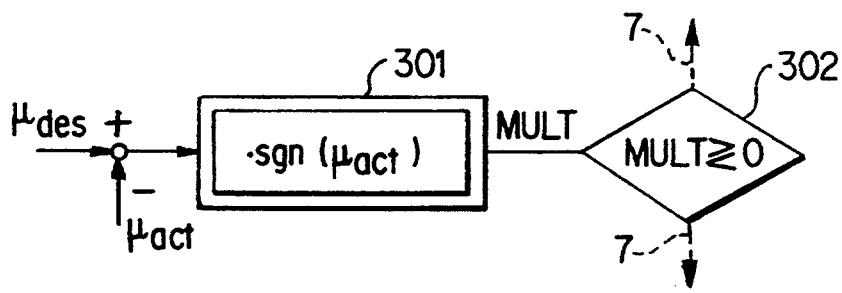
FIG. 3 is a schematic diagram of a second sequence diagram according to which the driving situation can be detected.

As can be seen from FIG. 3, the driving situation can also be detected in the computer unit 1 in that the difference of the actual value of the yaw angle rate $\mu_{act}$ from the desired value $\mu_{des}$ is evaluated in order that a decision can be made on understeering or oversteering handling. To this end, the difference is formed in that the actual value of the yaw angle rate $\mu_{act}$ is subtracted from the desired value of the yaw angle rate $\mu_{des}$. This difference is multiplied (301) in the computer unit 1 by the mathematical sign of the actual value of the yaw angle rate $\mu_{act}$, from which a result MULT is produced. By way of this result MULT, understeering or oversteering handling can be derived (302). If this variable MULT is positive, the magnitude of the desired value of the yaw angle rate $\mu_{des}$ is thus greater than the magnitude of the actual value of the yaw angle rate $\mu_{act}$, with the mathematical sign of the desired value $\mu_{des}$ and of the actual value $\mu_{act}$ being the same, however. In this case, the vehicle 10 slips via the front axle. This behavior of being unwilling to yaw is termed understeering. If the variable MULT is negative, the actual value of the yaw angle rate $\mu_{act}$ is thus greater than the desired value $\mu_{des}$, or the actual value of the yaw angle rate $\mu_{act}$ and the desired value $\mu_{des}$ have different mathematical signs. This behavior, in which the vehicle 10 has a greater yaw angle rate $\mu_{act}$ than the vehicle driver expects, is termed oversteering. An output signal 7 can in this situation be formed, for example, in that the variable MULT is considered in addition to the time derivative 8 when generating the output signal 7, in that, for example, an additional output signal 7 is generated only as a function of the variable MULT.

Figure 4:
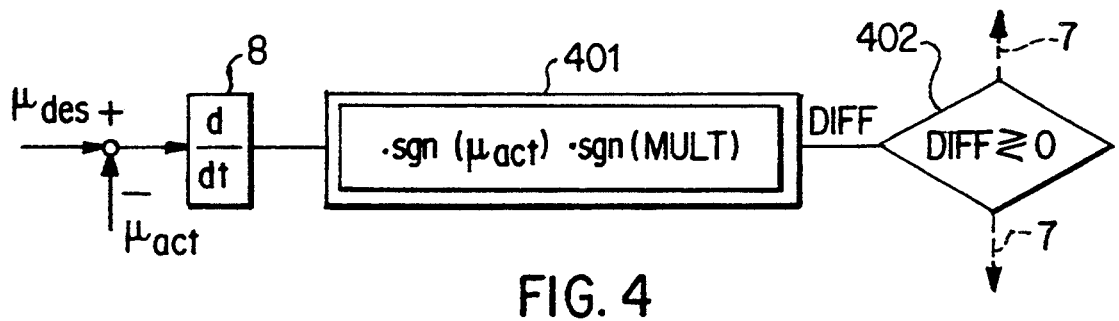
FIG. 4 is a schematic diagram of a third sequence diagram according to which the driving situation can be detected pursuant to the present invention.

In addition, in accordance with FIG. 4, a variable DIFF is determined, in that the time derivative 8 of the difference is multiplied by the mathematical sign of the actual value of the yaw angle rate $\mu_{act}$ and by the mathematical sign of the variable MULT. In the case of both understeering and oversteering, this variable DIFF has a positive value when an instability increase occurs, i.e. when the tendency towards oversteering or understeering increases. The variable DIFF correspondingly assumes a negative value when the tendency towards understeering or oversteering decreases. It is thus possible to detect an instability increase or an instability decrease by an interrogation of the variable DIFF.

In this case of an intervention into the steering or into the braking of individual wheels of the vehicle 10, it is thus possible to consider whether, in terms of the tendency, an increase in the instability of the handling is occurring or whether, in terms of the tendency, a decrease in the instability of the handling is occurring. A warning device 9, which can be monitored acoustically and/or visually by the vehicle driver, can likewise be driven by the output signal 7.

The order of magnitude of the understeering or oversteering behavior and the order of magnitude of the tendency towards an instability increase or an instability decrease can therefore be considered, for example, in that the output signal 7 is emitted as a function of the variables MULT and DIFF, it being possible for this dependency to be proportional (302, 402).

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for detecting an undesired yaw behavior of a vehicle, which behavior produces instability, comprising the steps of forming a desired value of the vehicle yaw angle rate $\mu_{des}$ in a computer unit from values measured by sensors on the vehicle, supplying to the computer unit at least one sensor signal to form an actual value of the vehicle yaw angle rate $\mu_{act}$, determining in the computer unit any difference between the desired value of the yaw angle rate $\mu_{des}$ and the actual value of the yaw angle rate $\mu_{act}$, by subtracting the actual value of the yaw angle rate $\mu_{act}$ from the desired value of the yaw angle rate $\mu_{des}$, forming a time derivative of the difference in the computer unit, and generating at least one output signal in the computer unit, said at least one output signal representing the detected undesired yaw behavior of the vehicle and is used to permit intervention in a control system of the vehicle to one of increase understeering handling and to reduce oversteering handling, wherein a first part of said at least one output signal is generated in the computer unit as a function of the difference, said first part being representative of understeering or oversteering handling of the vehicle, and a second part of the output signal is generated in the computer unit as a function of the time derivative of the difference, said second part being representative of an instability increase or decrease in the handling of the vehicle.

2. The method according to claim 1, wherein a variable MULT is determined in the computer unit by multiplying the difference by the mathematical sign of the yaw angle rate $\mu_{act}$, and generating an output signal representative of said understeering handling of the vehicle when the variable MULT is less than zero and an output signal which represents said oversteering handling of the vehicle when the variable MULT is greater than zero.

3. The method according to claim 2, wherein a variable DIFF is determined in the computer unit by multiplying the time derivative of the difference by the mathematical sign of the yaw angle rate $\mu_{act}$ and generating by the mathematical sign of the variable MULT, and an output signal representative of an increase in vehicle instability when the variable DIFF is greater than zero and an output signal representative of an instability decrease when the variable DIFF is less than zero.

4. The method according to claim 2, wherein an output signal representative of the order of magnitude of the understeering or oversteering handling is generated in the computer unit as a function of the value of the variable MULT.

5. The method according to claim 3, wherein an output signal representative of the order of magnitude of the instability increase or instability decrease is generated in the computer unit as a function of the value of the variable DIFF.

6. The method according to claim 1, wherein a warning device, arranged to be monitored by a vehicle driver, is operable as a function of said at least one output signal.

7. The method according to claim 6, wherein an output signal representative of a tendency towards an increasingly critical driving situation, is generated in the computer unit when the magnitude of the time derivative of the difference exceeds a threshold value.

8. The method according to claim 6, wherein a variable MULT is determined in the computer unit by multiplying the difference by the mathematical sign of the yaw angle rate $\mu_{act}$, and generating an output signal representative of said understeering handling of the vehicle when the variable MULT is less than zero and an output signal representative of said oversteering handling of the vehicle when the variable MULT is greater than zero.

9. The method according to claim 8, wherein a variable DIFF is determined in the computer unit by multiplying the time derivative of the difference by the mathematical sign of the yaw angle rate $\mu_{act}$ and by the mathematical sign of the variable MULT, and generating an output signal representative of an instability increase when the variable DIFF is greater than zero and an output signal representative of an instability decrease when the variable DIFF is less than zero.

10. The method according to claim 9, wherein an output signal representative of the order of magnitude of the instability increase or instability decrease is generated in the computer unit as a function of the value of the variable DIFF.

11. The method according to claim 3, wherein an intervention into at least one of the steering and braking of individual wheels of the vehicle occurs as a function of said at least one output signal.

12. The method according to claim 11, wherein an output signal representative of the order of magnitude of the instability increase or instability decrease is generated in the computer unit as a function of the value of the variable DIFF.

* * * * *